United States Patent
Ahn et al.

(10) Patent No.: US 8,721,886 B2
(45) Date of Patent: May 13, 2014

(54) RIVER WATER PURIFICATION APPARATUS AND METHOD USING TREATMENT SOIL LAYER AND PERMEABLE FILTERING MEDIUM LAYER

(75) Inventors: Kyu Hong Ahn, Seoul (KR); Kyung Guen Song, Seoul (KR); Kang Woo Cho, Seoul (KR); Dong-Won Ki, Seoul (KR); Jin Woo Cho, Seoul (KR); Se Yeon Won, Chungcheongnam-do (KR); Hae Seok Oh, Bucheon-si (KR); Ki Pal Kim, Seoul (KR)

(73) Assignee: Korea Institute of Science and Technology (KR)

( * ) Notice: Subject to any disclaimer, the term of this patent is extended or adjusted under 35 U.S.C. 154(b) by 655 days.

(21) Appl. No.: 12/917,919

(22) Filed: Nov. 2, 2010

(65) Prior Publication Data

US 2011/0100905 A1  May 5, 2011

(30) Foreign Application Priority Data

Nov. 2, 2009 (KR) .................. 10-2009-0104967

(51) Int. Cl.
 *C02F 3/30* (2006.01)
 *C02F 3/04* (2006.01)
(52) U.S. Cl.
 USPC ........... 210/605; 210/615; 210/617; 210/630; 210/170.09; 210/290; 210/903
(58) Field of Classification Search
 USPC ............ 210/605, 615, 616, 617, 630, 170.09, 210/290, 903
 See application file for complete search history.

(56) References Cited

U.S. PATENT DOCUMENTS

| | | | | |
|---|---|---|---|---|
| 4,184,947 A | * | 1/1980 | Demisch | 210/617 |
| 4,448,690 A | * | 5/1984 | Maphis | 210/609 |
| 4,824,572 A | * | 4/1989 | Scott | 210/602 |
| 4,826,601 A | * | 5/1989 | Spratt et al. | 210/610 |

(Continued)

FOREIGN PATENT DOCUMENTS

| | | | |
|---|---|---|---|
| DE | 3716637 A | * | 12/1988 |
| JP | 61-212386 A | * | 9/1986 |

(Continued)

OTHER PUBLICATIONS

Machine-generated English translation of DE 3716637. Printed Apr. 27, 2013.*

(Continued)

*Primary Examiner* — Fred Prince
(74) *Attorney, Agent, or Firm* — Cantor Colburn LLP

(57) ABSTRACT

Provided are an apparatus and a method for river water purification using a treatment soil layer and a permeable filtering medium layer. The river water purification apparatus includes a treatment soil layer and a permeable filtering medium layer which are sequentially and alternately stacked. The treatment soil layer includes a plurality of unit soil layers which are arranged at intervals. A reservoir part which stores a predetermined amount of river water and supplies the river water to an inside of the unit soil layer is provided in an upper end part of the unit soil layer. The permeable filtering medium layer has a higher hydraulic conductivity than that of the treatment soil layer. The river water purification apparatus increases a treatment flux of river water regardless of a coefficient of water permeability of soil and effectively removes nitrogen, phosphorus and nutrient salts by stably forming an anaerobic condition.

19 Claims, 4 Drawing Sheets

(56) References Cited

U.S. PATENT DOCUMENTS

| | | | |
|---|---|---|---|
| 5,958,239 A * | 9/1999 | Sing | 210/605 |
| 6,540,910 B2 * | 4/2003 | Schwarzenegger et al. | 210/151 |
| 6,719,902 B1 * | 4/2004 | Alvarez et al. | 210/601 |
| 6,890,439 B2 * | 5/2005 | Cameron | 210/617 |
| 7,531,089 B2 * | 5/2009 | Mankiewicz | 210/170.01 |
| 2003/0024874 A1 * | 2/2003 | Wallace et al. | 210/602 |
| 2005/0150829 A1 * | 7/2005 | Chen | 210/605 |
| 2006/0151387 A1 * | 7/2006 | Yost et al. | 210/605 |
| 2007/0227972 A1 * | 10/2007 | Buelna et al. | 210/617 |
| 2008/0257820 A1 * | 10/2008 | Peeters et al. | 210/605 |
| 2009/0101555 A1 * | 4/2009 | Scarpine et al. | 210/170.03 |

FOREIGN PATENT DOCUMENTS

| | | | |
|---|---|---|---|
| JP | 63-36895 A | * | 2/1988 |
| JP | 63-240991 A | * | 10/1988 |
| JP | 4-180886 A | * | 6/1992 |
| JP | 2002-239572 A | * | 8/2002 |
| JP | 2004-154696 | | 6/2004 |
| KR | 10-0586496 | | 5/2006 |

OTHER PUBLICATIONS

Machine-generated English translation of JP 2002-239572. Printed Apr. 27, 2013.*

* cited by examiner

RIVER WATER PURIFICATION APPARATUS AND METHOD USING TREATMENT SOIL LAYER AND PERMEABLE FILTERING MEDIUM LAYER

CROSS-REFERENCE TO RELATED APPLICATION

This application claims priority to Korean Patent Application No. 10-2009-0104967, filed on Nov. 2, 2009, and all the benefits accruing therefrom under 35 U.S.C. §119, the contents of which in its entirety are herein incorporated by reference.

BACKGROUND

1. Field

This disclosure relates to an apparatus and a method for river water purification using a treatment soil layer and a permeable filtering medium layer, and more particularly, to an apparatus and a method for river water purification using a treatment soil layer and a permeable filtering medium layer capable of increasing a treatment flux of river water regardless of a coefficient of water permeability of soil and effectively removing nitrogen, phosphorus and nutrient salts by stably forming an anaerobic condition.

2. Description of the Related Art

The traditional river improvements based on embankment cause straightening of the river and destruction of the river environment, and due to this, the residence time of a river stream is reduced, resulting in loss of self-purification capacity of the river. Since river contamination is characterized by a large water volume and a low contamination level, application of a wastewater treatment process to the entire water volume of the river is not practical from the economic point of view. Therefore, demand for a nature-friendly water purification technique capable of restoring the self-purification of river and naturally maintaining clean water is increasing.

Water purification techniques using contact oxidation facilities, artificial wetlands, artificial vegetated islands, and the like have advantages of excellent biological removal efficiency due to vegetation and microorganisms and improvement in scenery. However, they also have limitations in that the function cannot be maintained or the structure itself may be collapsed in the event of a flood. In order to overcome these limitations, a nature-friendly water purification method in consideration of basin spaces including surface water, underground water, and land is needed.

In this aspect, in Korean Patent Registration No. 586496 (Underflow type wastewater treatment system constructed at the edge of water and wastewater treatment method of the same), an underflow purification land is formed at the edge of a river or a lake to decompose organic materials using filtration and adsorption by soil and microbial metabolism and to remove nitrogen and phosphorus by planting vegetation, so as to improve water quality. However, in this method, the treatment capacity absolutely depends on the coefficient of permeability of the soil layer. Therefore, in the case where soil with low permeability is used, it is difficult to ensure the treatment capacity, and since clogging occurs during a long-term operation, there is a problem in that it is difficult to maintain the operation.

In order to solve the problems, a multi stage soil layer method has been developed. A multi stage soil layer method disclosed in Japanese Unexamined Patent Publication No. 2004-154696 is based on the purification method using soil, with the structure improved to change a fluid flow. Specifically, in the method, soil is formed into blocks with a predetermined shape, the blocks of the soil layer are laminated in a reactor in the shape of a brick, and a water flow layer is formed between the soil layers to enhance water permeability. In the case of this method, there is an advantage in that the treatment volume is increased by enhancing the water permeability of the soil layers. However, since most of river water permeates through the permeable layer during permeation of the river water, a quantity of water permeating into the soil layer which plays an important role in the treatment of the river water is reduced, and thus there is a problem in that the treatment efficiency is relatively decreased. Particularly, since the velocity of the fluid permeation is relatively high, a residence time of the fluid in the soil layer is reduced. Accordingly, it is very difficult to form an anaerobic condition which is necessary for denitrification playing an important role in nitrogen removal, and thus nitrogen removal efficiency is decreased.

SUMMARY

This disclosure provides an apparatus and a method for river water purification using a treatment soil layer and a permeable filtering medium layer capable of increasing a treatment flux of river water regardless of a coefficient of water permeability of soil and effectively removing nitrogen, phosphorus and nutrient salts by stably forming an anaerobic condition.

In one aspect, there is provided a river water purification apparatus using a treatment soil layer and a permeable filtering medium layer, including: a treatment soil layer and a permeable filtering medium layer which are sequentially and alternately stacked, wherein the treatment soil layer includes a plurality of unit soil layers which are arranged at intervals, a reservoir part which stores a predetermined amount of river water and supplies the river water to an inside of the unit soil layer is provided in an upper end part of the unit soil layer, and the permeable filtering medium layer has a higher hydraulic conductivity than that of the treatment soil layer.

Aerobic organisms and anaerobic organisms are included in the unit soil layer, and the aerobic organisms decompose an organic material in the river water using oxygen dissolved in the river water and converts organic nitrogen and ammonia nitrogen ($NH_4$—N) existing in the river water into nitrate nitrogen ($NO_3$—N) through nitrification. The anaerobic organisms reduce the nitrate nitrogen to nitrogen gas in an anaerobic state where the dissolved oxygen has been consumed by the aerobic organisms. The aerobic organisms may be provided in an upper layer part of the unit soil layer, and the anaerobic organisms may be provided in a lower layer part of the unit soil layer.

A volume of the reservoir part may be $1/5$ to $1/3$ of a volume of the unit soil layer. The reservoir part may further include an adsorption filtering medium for adsorbing contaminants in the river water and removing the contaminants through ion exchange. The adsorption filtering medium may comprise one of granitic soil, activated carbon, zeolite, perlite, humus, and slag or a combination thereof.

A hydraulic conductivity of the unit soil layer is controlled by mixing natural soil and a filtering medium, and the permeable filtering medium layer is interposed between the treatment soil layer and the unit soil layer to adsorb ammonia nitrogen or phosphorus existing in the river water or remove contaminants in the river water through ion exchange. The permeable filtering material layer and the filtering medium of the unit soil layer may be formed of the same material as the adsorption filtering medium.

A river water distribution pipe may further be included which is disposed in a lattice form inside the treatment soil layer and the permeable filtering medium layer to supply the river water. In a state where the treatment soil layer or the permeable filtering medium layer is divided into a plurality of sections, the river water supplied to each of the sections through the river water distribution pipe may be selectively supplied or blocked. In addition, the river water distribution pipe may be provided to directly supply the river water to an inside of the permeable filtering medium layer in the state where the treatment soil layer and the permeable filtering medium layer are alternately stacked.

An aeration pipe may further be included which is provided in one or more of the treatment soil layer and the permeable filtering medium layer to supply oxygen to the treatment soil layer or the permeable filtering medium layer. In addition, a storage tank may further be included which is provided under the lowermost treatment soil layer or the lowermost permeable filtering medium layer and in which treatment water which is finally treated through the treatment soil layer and the permeable filtering medium layer is collected.

A shielding wall may be provided on a periphery and on a floor of the treatment soil layer and the permeable filtering medium layer, and a gravel layer may be provided in the lowermost treatment soil layer or under the permeable filtering medium layer such that the gravel layer functions as the storage tank. The treatment water collected in the storage tank may be discharged to the river or stored in a separate sump.

In addition, a pre-treatment detention tank may further be included which temporarily detains lifted river water to cause various floating materials on the river water such as soil erosion, algae, and fine floc to precipitate and be separated.

In another aspect, there is provided a river water purification method using a treatment soil layer and a permeable filtering medium layer, including: sequentially and alternately stacking a treatment soil layer including a plurality of unit soil layers and a permeable filtering medium layer; supplying river water to a reservoir part provided in an upper end part of the unit soil layer to permeate into the unit soil layer; converting organic nitrogen and ammonia nitrogen ($NH_4$—N) into nitrate nitrogen ($NO_3$—N) by aerobic organisms in the unit soil layer; and reducing the nitrate nitrogen to nitrogen gas in an anaerobic state to remove organic materials and nitrogen components in the river water by anaerobic organisms in the unit soil layer. Here, a hydraulic conductivity of the permeable filtering medium layer may be higher than that of the treatment soil layer.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
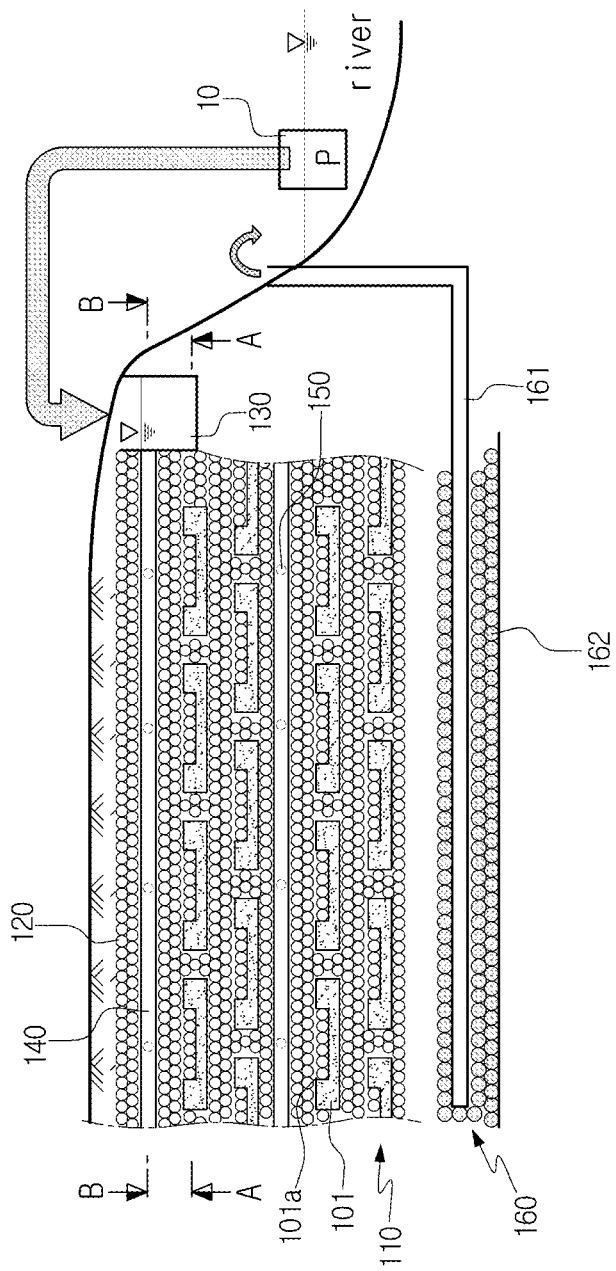
FIG. 1 is a cross-sectional view of a river water purification apparatus using a treatment soil layer and a permeable filtering medium layer according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, a river water purification apparatus and a river water purification method using a treatment soil layer and a permeable filtering medium layer according to an embodiment will be described in detail with reference to the accompanying drawings.

Figure 2:
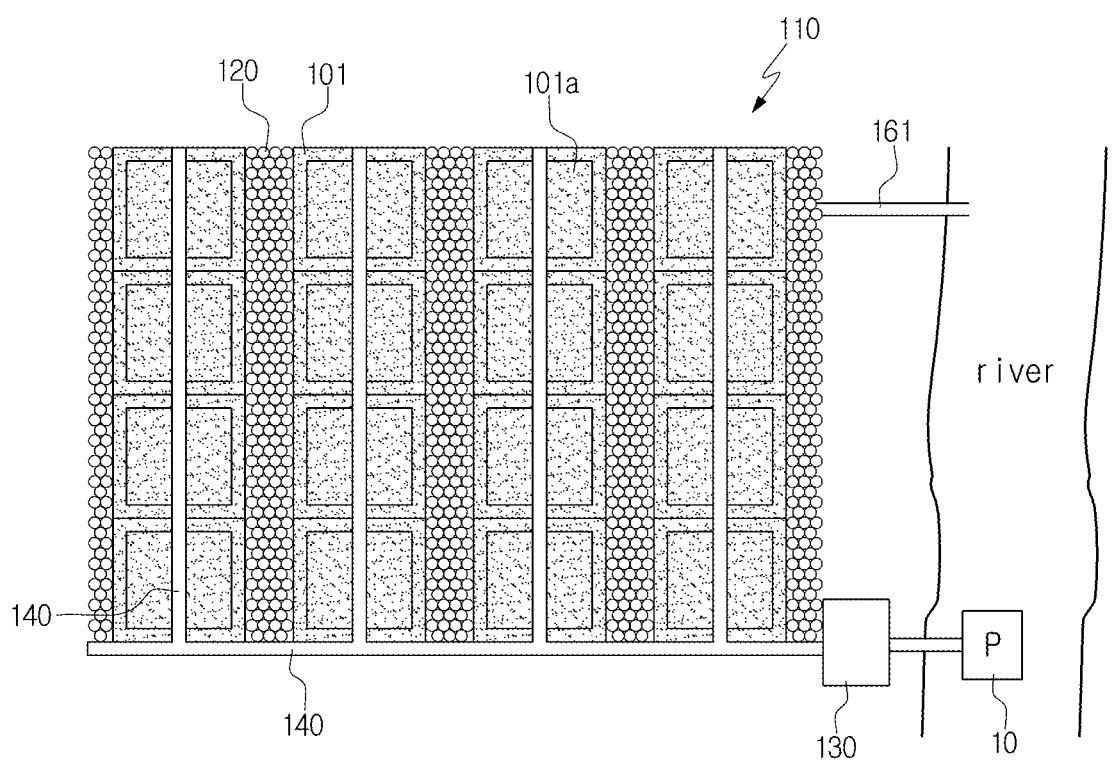
FIG. 2 is an elevation view illustrating an overlap of cross-sections taken along the lines A-A' and B-B' of FIG. 1.

As illustrated in FIGS. 1 and 2, a river water purification apparatus according to an embodiment includes treatment soil layers 110 and permeable filtering medium layers 120.

The treatment soil layers 110 and the permeable filtering medium layers 120 are stacked sequentially and alternately, and each of the treatment soil layers 110 has a structure in which a plurality of unit soil layers 101 having a predetermined volume are disposed at predetermined intervals. Here, a stacking order of the treatment soil layers 110 and the permeable filtering medium layers 120 may be changed, and accordingly, the uppermost layer or the lowermost layer may include the treatment soil layer 110 or the permeable filtering medium layer 120.

The treatment soil layer 110 serves to remove organic materials or nitrogen components in river water through biological reactions. The permeable filtering medium layer 120 serves to remove contaminants in the river water through adsorption or ion exchange and supply the river water to each treatment soil layer 110 so that the biological reactions may occur repeatedly.

Figure 3:
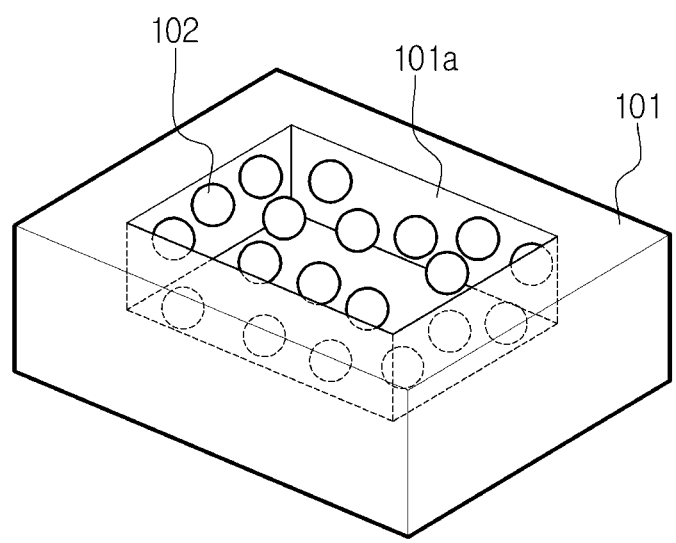
FIG. 3 is a perspective view of a unit soil layer according to an embodiment.

Specifically, the unit soil layer 101 included in the treatment soil layer 110 is a unit member for removing contaminants in the river water through biological reactions, and as illustrated in FIG. 3, a reservoir part 101a is formed at an upper end part of each of the unit soil layers 101 to store a predetermined amount of river water. The river water stored in the reservoir part 101*a* is absorbed by the unit soil layer 101 for a predetermined time and is discharged as treatment water from which contaminants are removed through the biological reactions of the unit soil layer 101.

The unit soil layer 101 includes aerobic organisms and anaerobic organisms. The aerobic organisms decompose organic materials in the river water using oxygen dissolved in the river water and convert organic nitrogen and ammonia nitrogen ($NH_4$—N) existing in the river water into nitrate nitrogen ($NO_3$—N) through nitrification. The anaerobic organisms induce so-called denitrification which is a reaction for reducing the nitrate nitrogen to nitrogen gas in a state where the dissolved oxygen has been consumed by the aerobic organisms, i.e., in an anaerobic state. In short, in a process of permeation of the river water in the reservoir part 101*a* of the unit soil layer 101 into the unit soil layer 101, dissolved oxygen in the river water is consumed for the decomposition of the organic material by the aerobic organisms and the nitrification. In the anaerobic state in which the dissolved oxygen has been consumed, nitrate nitrogen in the river water is reduced to nitrogen gas by the anaerobic organisms, and through the process, organic materials and nitrogen components in the river water are removed. Accordingly, the aerobic organisms may be included in an upper layer part of the unit soil layer 101, and the anaerobic organisms may be included in a lower layer part of the unit soil layer 101. The aerobic organisms and the anaerobic organisms in the unit soil layer 101 may be those existing in natural soil or those cultivated artificially.

Figure 4A:
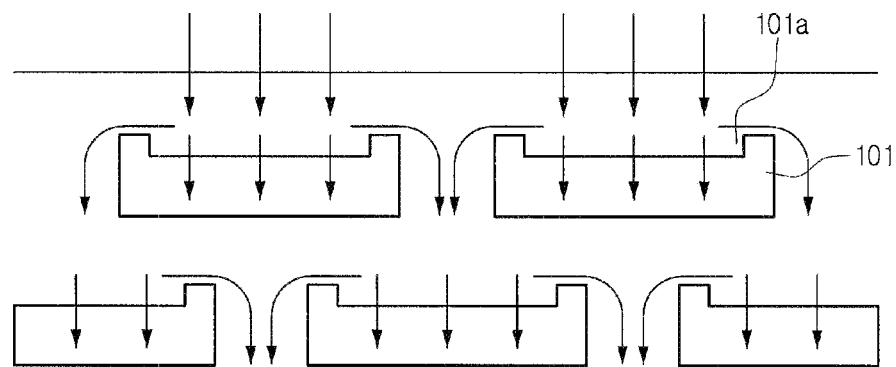
FIGS. 4A and 4B are diagrams respectively illustrating flows of river water permeating into a unit soil layer according to an embodiment of the present disclosure and a unit soil layer without a reservoir part.
Figure 4B:
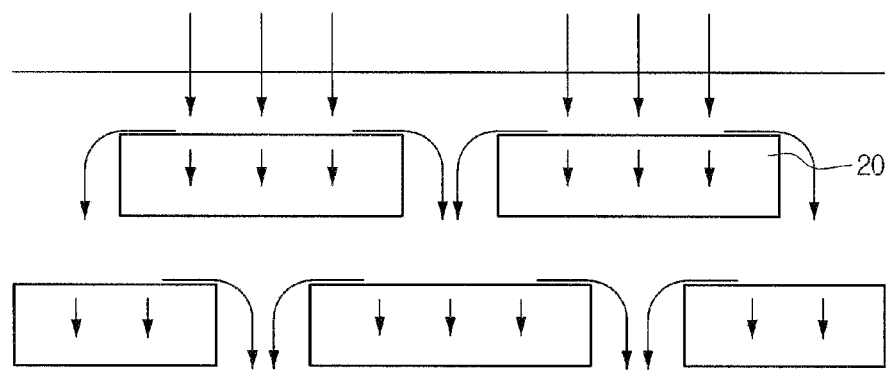

In order to activate the biological reactions in the treatment soil layer 110, i.e., in the unit soil layer 101, a volume of river water absorbed by the unit soil layer 101 has to be increased. For this, the reservoir part 101*a* is provided in the upper end part of each of the unit soil layers 101 as described above (see FIG. 4A). On the other hand, when the reservoir part 101*a* is not provided in the upper end part of the unit soil layer 101, as illustrated in FIG. 4B, a volume of the river water permeating into the soil layer 20 is reduced, and thus biological removal of contaminants in the river water is not performed effectively.

When considering the hydraulic conductivity of the unit soil layer 101, the volume of the reservoir part 101*a* may be ⅕ to ⅓ of the volume of the unit soil layer 101. In addition, an adsorption filtering medium 102 may further be included in the reservoir part 101*a*. The adsorption filtering medium 102 has a function of removing contaminants in the river water stored in the reservoir part 101*a* through adsorption and ion exchange, and the adsorption filtering medium 102 may be made of the same material as a filtering medium of the permeable filtering medium layer 120 described later.

The efficiency of biological reactions in the unit soil layer 101 and a treatment quantity of the river water may be changed by controlling the coefficient of permeability of the unit soil layer 101, i.e., the hydraulic conductivity. In a case where the hydraulic conductivity of the unit soil layer 101 is low, permeation speed is reduced, and residence time is increased, so that the biological reaction efficiency is increased but the treatment quantity of the river water is reduced. On the contrary, in a case where the hydraulic conductivity of the unit soil layer 101 is high, permeation speed is increased, and residence time is reduced, so that the biological reaction efficiency is reduced but the treatment quantity of the river water is increased. In consideration of such relationship between the biological reaction efficiency and the treatment quantity of the river water, the hydraulic conductivity of the unit soil layer 101 may be set to be in the range of 0.001 to 0.05 cm/s. The unit soil layer 101 includes natural soil and filtering media. The hydraulic conductivity of the unit soil layer 101 may be selectively set by suitably mixing them. The filtering media may comprise one of granitic soil, activated carbon, zeolite, perlite, humus and slag or a combination thereof.

The permeable filtering medium layer 120 is interposed between the treatment soil layers 110 and between the unit soil layers 101 to adsorb ammonia nitrogen or phosphorus existing in the river water or remove contaminants in the river water through ion exchange. The permeable filtering medium layer 120 may be made of the same material as the filtering media of the unit soil layer 101. That is, the permeable filtering medium layer 120 may comprise one of granitic soil, activated carbon, zeolite, perlite, humus and slag or a combination thereof. The permeable filtering medium layer 120 has a function of increasing the treatment capacity by complementing the low permeability of the treatment soil layer 110. For this, the filtering media of the permeable filtering medium layer 120 may have a particle size of 1 to 5 mm.

According to an embodiment, the total height of the treatment soil layers 110 and the permeable filtering medium layers 120 which are alternately stacked several times may be designed to be 1 to 5 m in consideration of groundwater level, river water level, and coefficient of river regime. Here, the height of each of the treatment soil layer 110 and the permeable filtering medium layer 120 may be in the range of 5 to 25 cm, and transverse and longitudinal lengths of the unit soil layer 110 may be in the range of 10 to 50 cm.

In addition to the treatment soil layer 110 and the permeable filtering medium layer 120, the river water purification apparatus according to an embodiment includes a pre-treatment detention tank 130, a river water distribution pipe 140, an aeration pipe 150, and a storage tank 160.

The pre-treatment detention tank 130 has a function of temporarily detaining the river water lifted by a lifting pump 10 to cause various floating materials on the river water such as soil erosion, algae, and fine floc to precipitate and be separated. The pre-treatment detention tank 130 may be constructed as a detention pond in the form of an artificial wetland or a permeation-type filtering pond having soil filtering media with high permeability. Here, without an additional lifting pump, an aqueduct pipe may be provided on an upstream of the river or an artificial small river may be formed so that the river water flows naturally and is supplied into the pre-treatment detention tank 130.

The river water distribution pipe 140 is disposed in a lattice form inside the treatment soil layer 110 or the permeable filtering medium layer 120 to uniformly supply the river water of the pre-treatment detention tank 130. The river water supplied through the river water distribution pipe 140 may be selectively controlled depending on the position of the treatment soil layer 110 or the permeable filtering medium layer 120. For example, the treatment soil layer 110 or the permeable filtering medium layer 120 may be divided into a plurality of sections to selectively supply the river water to the sections, thereby controlling an operation and stopping of the operation. In addition, the river water distribution pipe 140 may be arranged to directly supply the river water to the inside of the permeable filtering medium layer 120 in the state where the treatment soil layers 110 and the permeable filtering medium layers 120 are alternately stacked. The flux of the pre-treated river water supplied through the river water distribution pipe 140 may be supplied at about 500 to 10,000 L/$m^2$·day in consideration of the hydraulic conductivity and design of the treatment soil layer 110 so that voids in the treatment soil layer 110 are not saturated completely, or may be supplied intermittently with predetermined intervals.

The aeration pipe 150 may be provided in one or more of the treatment soil layer 110 and the permeable filtering medium layer 120 to supply oxygen to the treatment soil layer 110 or the permeable filtering medium layer 120 and prevent clogging during a long-term operation. It also serves as an oxygen supply source when dissolved oxygen is insufficient.

The storage tank 160 is a space which is provided under the lowermost treatment soil layer 110 or the permeable filtering medium layer 120 and in which treatment water which is finally treated through the treatment soil layer 110 and the permeable filtering medium layer 120 is collected. The treatment water collected in the storage tank 160 is transferred to the river through a storage pipe 161. If positions of the treatment soil layer 110 and the permeable filtering medium layer 120 are lower than the groundwater level or isolation from the ground water is need, a shielding wall made of concrete or a clay layer with extremely low coefficient of permeability may be provided on the periphery or on the floor of the treatment soil layer 110 and the permeable filtering medium layer 120. In this case, a gravel layer 162 may be provided under the lowermost treatment soil layer 110 or the permeable filtering medium layer 120 such that the gravel layer 162 functions as the storage tank 160. The collected treatment water may not be discharged to the river but may be stored in an additional sump to be used for improving water quality or controlling a river water volume.

The river water purification apparatus and the method using a treatment soil layer and a permeable filtering medium layer according to the present disclosure provide the following effects.

Purification of a large volume of water is possible regardless of the coefficient of water permeability of soil near the river, and since a reservoir part is further provided in the treatment soil layer compared to a water purification method using an existing soil layer, additional denitrification is induced, thereby improving nitrogen removing ability.

In addition, the constituent materials of the treatment soil layer and the permeable filtering medium layer may be varied to remove various contaminants existing in treatment water physically and/or chemically through filtration, adsorption or ion exchange, and biological decomposition under various oxidation and reduction conditions.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A river water purification apparatus comprising:
   a treatment soil layer and a permeable filtering medium layer which are sequentially and alternately stacked,
   wherein the treatment soil layer includes a plurality of unit soil layers which are arranged at intervals,
   a reservoir part which stores a predetermined amount of river water and supplies the river water to an inside of the unit soil layer is provided in an upper end part of the unit soil layer, and
   wherein the permeable filtering medium layer is interposed between the treatment soil layers and between the unit soil layers and the permeable filtering medium layer has a higher hydraulic conductivity than that of the treatment soil layer.

2. The river water purification apparatus according to claim 1,
   wherein aerobic organisms and anaerobic organisms are included in the unit soil layer,
   the aerobic organisms decompose an organic material in the river water using oxygen dissolved in the river water and convert organic nitrogen and ammonia nitrogen ($NH_4$—N) existing in the river water into nitrate nitrogen ($NO_3$—N) through nitrification, and
   the anaerobic organisms reduce the nitrate nitrogen to nitrogen gas in an anaerobic state where the dissolved oxygen has been consumed by the aerobic organisms.

3. The river water purification apparatus according to claim 2, wherein the aerobic organisms are provided in an upper layer part of the unit soil layer, and the anaerobic organisms are provided in a lower layer part of the unit soil layer.

4. The river water purification apparatus according to claim 1, wherein a volume of the reservoir part is $1/5$ to $1/3$ of a volume of the unit soil layer.

5. The river water purification apparatus according to claim 1,
   wherein the reservoir part further includes an adsorption filtering medium for adsorbing contaminants in the river water and removing the contaminants through ion exchange, and
   the adsorption filtering medium comprises one of granitic soil, activated carbon, zeolite, perlite, humus, and slag or a combination thereof.

6. The river water purification apparatus according to claim 1,
   wherein a hydraulic conductivity of the unit soil layer is controlled by mixing natural soil and a filtering medium, and
   the filtering medium comprises one of granitic soil, activated carbon, zeolite, perlite, humus, and slag or a combination thereof.

7. The river water purification apparatus according to claim 1,
   wherein the permeable filtering medium layer is interposed between the treatment soil layer and the unit soil layer to adsorb ammonia nitrogen or phosphorus existing in the river water or remove contaminants in the river water through ion exchange, and
   the permeable filtering medium layer comprises one of granitic soil, activated carbon, zeolite, perlite, humus, and slag or a combination thereof.

8. The river water purification apparatus according to claim 1, further comprising a river water distribution pipe which is disposed in a lattice form inside the treatment soil layer and the permeable filtering medium layer to supply the river water.

9. The river water purification apparatus according to claim 8, wherein, in a state where the treatment soil layer or the permeable filtering medium layer is divided into a plurality of sections, the river water supplied to each of the sections through the river water distribution pipe is selectively supplied or blocked.

10. The river water purification apparatus according to claim 8, wherein the river water distribution pipe is provided to directly supply the river water to an inside of the permeable filtering medium layer in the state where the treatment soil layer and the permeable filtering medium layer are alternately stacked.

11. The river water purification apparatus according to claim 1, further comprising an aeration pipe which is provided in one or more of the treatment soil layer and the permeable filtering medium layer to supply oxygen to the treatment soil layer or the permeable filtering medium layer.

12. The river water purification apparatus according to claim 1, further comprising a storage tank which is provided under the lowermost treatment soil layer or the lowermost permeable filtering medium layer and in which treatment water which is finally treated through the treatment soil layer and the permeable filtering medium layer is collected.

13. The river water purification apparatus according to claim 12,
wherein a shielding wall is provided on a periphery and on a floor of the treatment soil layer and the permeable filtering medium layer, and
a gravel layer is provided under the lowermost treatment soil layer or the permeable filtering medium layer such that the gravel layer functions as the storage tank.

14. The river water purification apparatus according to claim 12, wherein the treatment water collected in the storage tank is discharged to the river or stored in a separate sump.

15. The river water purification apparatus according to claim 1, further comprising a pre-treatment detention tank which temporarily detains lifted river water to cause various floating materials on the river water such as soil erosion, algae, and fine floc to precipitate and be separated.

16. A river water purification method comprising the steps of:
sequentially and alternately stacking a treatment soil layer including a plurality of unit soil layers and a permeable filtering medium layer;
supplying river water to a reservoir part provided in an upper end part of the unit soil layer to permeate into the unit soil layer;
converting organic nitrogen and ammonia nitrogen ($NH_4$—N) into nitrate nitrogen ($NO_3$—N) by aerobic organisms in the unit soil layer; and
reducing the nitrate nitrogen to nitrogen gas in an anaerobic state to remove organic materials and nitrogen components in the river water by anaerobic organisms in the unit soil layer.

17. The river water purification method according to claim 16,
wherein a hydraulic conductivity of the unit soil layer is 0.001 to 0.05 cm/s, and
a hydraulic conductivity of the permeable filtering medium layer is higher than that of the unit soil layer.

18. The river water purification method according to claim 16, further comprising performing pre-treatment of causing floating materials on the river water to precipitate and be separated before the river water is supplied to the treatment soil layer and the permeable filtering medium layer.

19. The river water purification method according to claim 16,
wherein the river water is supplied through a river water distribution pipe which is disposed in a lattice form inside the treatment soil layer and the permeable filtering medium layer, and
in a state where the treatment soil layer or the permeable filtering medium layer is divided into a plurality of sections, the river water supplied to each of the sections through the river water distribution pipe is selectively supplied or blocked.

* * * * *